Nov. 28, 1944.       A. T. ANDERSON       2,363,487
COATING APPARATUS
Filed June 29, 1942
Fig-1-
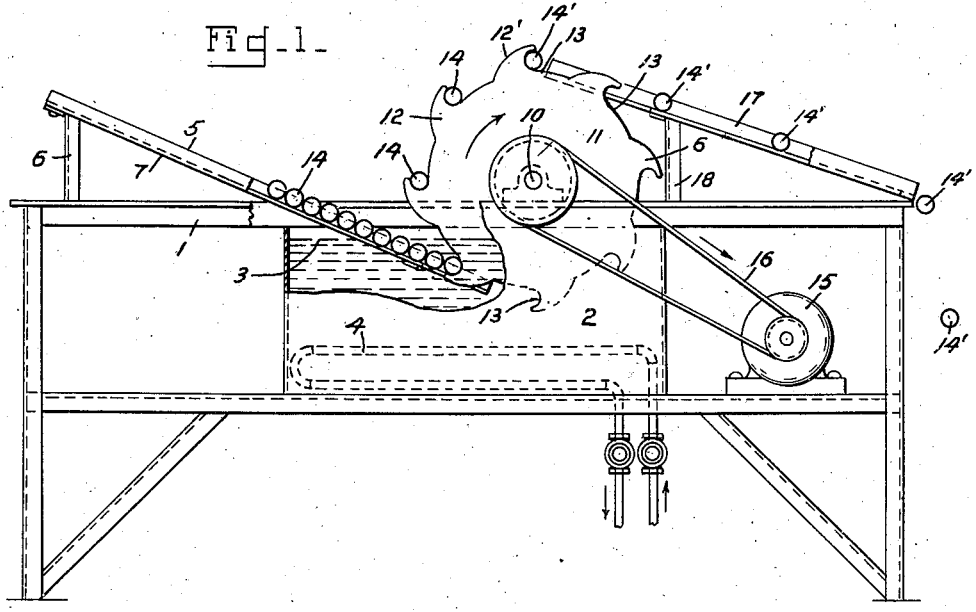
Fig-2-
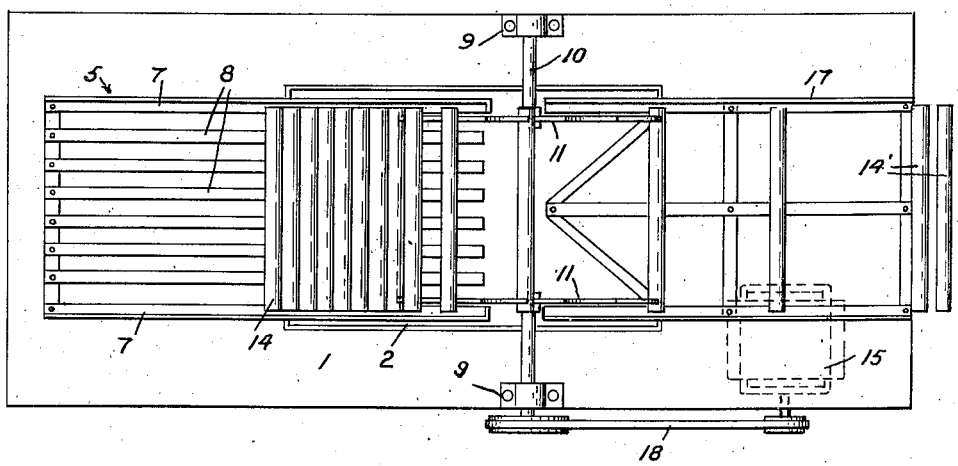
Inventor
Andrew T. Anderson
By G. J. Kessenich, J. H. Church
Attorneys Patented Nov. 28, 1944

2,363,487

UNITED STATES PATENT OFFICE 2,363,487

COATING APPARATUS

Andrew T. Anderson, Dover, N. J.

Application June 29, 1942, Serial No. 449,017

3 Claims. (Cl. 91—46)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a machine for coating packages, such as for instance the waterproofing of cannisters containing loaded ammunition by dipping in molten wax.

The invention comprises a machine in which the articles to be coated are gravity fed into a bath of the coating material and picked up and ejected after a predetermined dwell in the bath.

It is therefore an object of the invention to provide a feed mechanism which will be automatic in operation with certainty of functioning and a definite time of dwell, accompanied by agitation.

The specific nature of the invention as well as other objects and advantages thereof will clearly appear from a description of a preferred embodiment as shown in the accompanying drawing in which:

Figure 1 is a view in elevation of a machine embodying the invention, and

Figure 2 is a top plan view of Figure 1.

Referring to the drawing by characters of reference, there is shown generally at 1 a table on which is mounted a tank 2 containing a coating material 3. Where a coating material normally existing in the solid or viscous form at ordinary temperatures is used, a heating element such as a steam pipe 4, or other means, may be provided.

Attached to the tank in any convenient manner is an inclined runway 5 supported in its angular position by braces 6. The runway 5, as shown comprises angle bars 7 for side pieces and spaced slabs 8 intermediate thereof. The spaces between slabs afford readier circulation of the coating material and certain of them serve an additional function as will subsequently appear.

Mounted on the table 1 and journalled in bearings 9 is a shaft 10 carrying two toothed wheels 11. These wheels 11 are so positioned that the teeth 12 of each pass between a pair of adjacent slabs of the runway 5. The teeth are roughly in the form of a semi-crescent and their base circle 13 is dimensioned to clear the tops of cylindrical work pieces 14 on the runway 5. Further, the teeth 12 are angularly spaced one from the other so that when one tooth has lifted a work piece from the runway sufficiently to permit the other work pieces to roll downward under the action of gravity, the succeeding tooth will be in position to receive the next workpiece and prevent it from falling from the lower end of the runway. This spacing of the teeth represents a limiting condition as a function of the work piece diameter, the speed of descent of the work piece and other factors. The elevating wheels 11 are powered by any convenient means, such as a motor 15 through a belt 16 or sprocket chains or gearing as desired and the functioning being largely controlled by the geometric relation between the elevator wheel and workpieces, the time of dwell of the work pieces in the coating both may be adequately controlled by the speed of the motor 15 and suitable gearing.

When a tooth, such as 12' is at the top position of the wheel, the work piece 14' commences to roll along the base circle 13 and is received on a runway 17 which is attached to the table 1 and held in inclined position by braces 18.

It will be noted that, in addition to the automatic action of processing the work pieces after they have been positioned on the runway 5, that the pieces are thoroughly worked in the coating bath by the reciprocal motion imparted to them by the combined effects of gravity and the elevator wheel. That is to say, in lifting a work piece, the wheel moves the whole line of cylinders up the ramp, and this motion is reversed when the seized work piece clears the line of the following pieces.

I claim:

1. A machine for processing articles comprising a coating bath an inclined runway with lower portion in the region where processing occurs, a slot in said runway, a wheel, teeth on said wheel positioned to sweep said slot and adapted to lift an article therefrom, said teeth being so spaced from each other that a tooth is positioned to receive an article on the runway when the preceding tooth has lifted an article sufficient to permit downward roll of the succeeding article.

2. A coating machine comprising a table, a coating bath on said table, an inclined runway with its lowermost end in said bath, longitudinal slots in said runway including the portion in the bath, a shaft mounted for rotation on said table, wheels on said shaft, said wheels being integrated for simultaneous movement, teeth on the periphery of said wheels positioned to sweep the said slots and having a face formed to receive an article of circular section, said teeth being angularly spaced so that a succeeding tooth is in position in a slot to receive an article when the lowermost article has been lifted by the preceding tooth to clear the line of articles on the runway, said wheel and teeth and runway being so positioned relative to each other that the line of articles on the runway is reversed in motion while in the bath against the action of gravity as the lowermost article is raised, means to rotate the wheel and an inclined runway with its upper portion positioned to receive articles from each tooth at its highest position during rotation of the wheel.

3. A machine as in claim 1, said wheel and teeth being so positioned with respect to said runway that the balance of articles on the runway receive a motion while fully immersed in the bath reverse to that induced by gravity during the action of lifting the lowermost article from the runway.

ANDREW T. ANDERSON.